(12) United States Patent
Lai

(10) Patent No.: US 7,611,113 B2
(45) Date of Patent: Nov. 3, 2009

(54) PORTABLE ELECTRONIC DEVICE

(75) Inventor: Yiu-Wai Lai, Taipei (TW)

(73) Assignee: Inventec Corporation, Taipei (TW)

( * ) Notice: Subject to any disclaimer, the term of this patent is extended or adjusted under 35 U.S.C. 154(b) by 232 days.

(21) Appl. No.: 11/699,373

(22) Filed: Jan. 30, 2007

(65) Prior Publication Data

US 2008/0180892 A1 Jul. 31, 2008

(51) Int. Cl.
*E04G 3/00* (2006.01)
(52) U.S. Cl. .................... 248/286.1; 248/429; 248/917; 248/918
(58) Field of Classification Search ................ 248/429, 248/424, 286.1, 285.1, 917, 923, 918; 361/681, 361/683
See application file for complete search history.

(56) References Cited

U.S. PATENT DOCUMENTS

| | | | | |
|---|---|---|---|---|
| 4,116,413 A | * | 9/1978 | Andersen | ..................... 248/451 |
| 4,960,256 A | * | 10/1990 | Chihara et al. | ........... 248/286.1 |
| 5,209,448 A | * | 5/1993 | Hatanaka et al. | ............ 248/455 |
| 5,548,478 A | * | 8/1996 | Kumar et al. | ............... 361/681 |
| 6,850,226 B2 | | 2/2005 | Finke-Anlauff | |
| 6,903,927 B2 | | 6/2005 | Anlauff | |
| 6,980,420 B2 | | 12/2005 | Maskatia et al. | |
| 2006/0256516 A1 | * | 11/2006 | Cho | ........................... 361/683 |
| 2007/0217129 A1 | * | 9/2007 | Chuang et al. | .............. 361/679 |

* cited by examiner

*Primary Examiner*—Amy J. Sterling
(74) *Attorney, Agent, or Firm*—Muncy, Geissler, Olds & Lowe, PLLC

(57) ABSTRACT

A portable electronic device including a secondary body having a touch screen and a primary body having a keyboard is provided. The secondary body slides and rotates relative to the primary body, such that the secondary body selectively makes the touch screen is back towards the primary body and cover the keyboard, so as to provide a first operation mode for operating the touch screen; or the secondary body is inclined relative to the primary body at a certain angle to show the keyboard on the primary body, so as to provide a second operation mode for operating the keyboard. Thus, various operation and accommodation aspects are provided.

4 Claims, 9 Drawing Sheets

PORTABLE ELECTRONIC DEVICE

BACKGROUND

1. Field of Invention

The present invention relates to a portable electronic device, and more particularly, to a portable electronic device having a display screen capable of sliding and rotating on a primary base.

2. Related Art

The structure of a conventional notebook generally includes two main parts, i.e., a primary base and a screen connected with the primary base via a revolving shaft mechanism. When the notebook is used, the display screen of the notebook will be opened.

Currently, a portable computer platform called Ultra Mobile Personal Computer (UMPC) is available in market. The size of the UMPC is between that of a personal digital assistant (PDA) and that of an ultra slim notebook. As the UMPC is light, thin, small, and chic, it can be placed into a pocket, which is very convenient to carry along. Similarly, the UMPC also includes a primary base and a display screen, and has built-in WLAN and built-in multimedia player, so as to meet the requirements on communication, entertainment, and information, etc. As the display screen is slidably mounted on the primary base, when being pushed, the display screen slides and moves along rails opened in the primary base. When the UMPC is not used, the display screen covers a keyboard on the primary base; and when the UMPC needs to be used, the display screen is pushed to slide away to expose the keyboard. However, the display screen can only slide on the primary base, when a user needs to operate the keyboard, the viewing angle and viewing position are greatly limited, and the selectivity is very low, which is inconvenient for the user.

Therefore, U.S. Pat. No. 6,850,226 discloses a mobile computer with a slidable display screen, so as to solve the viewing angle problem. The mobile computer includes a primary body and a display screen joined to the primary base. The primary base also has a keyboard; and the display screen slides along rails opened in the primary base, and it is capable of rotating relative to the primary base at specific positions on the rails. Thus, the display screen selectively covers or exposes the keyboard, and the rotation angle of the display screen can be further adjusted after the keyboard is exposed.

Moreover, U.S. Pat. No. 6,903,927 also discloses a mobile computer, wherein a display screen is closely engaged with rails in a primary base, and a jointing member is disposed on the back of the primary base, so as to pivot the primary base on the back of the display screen. Thus, the display screen not only slides relative to the primary base, but also rotates forwards or backwards to get close to the primary base, such that the display screen faces the primary base or moves away from the primary base, which constitutes the operation modes of a notebook computer or a tablet computer respectively.

The display screen in the prior art is directly joined to the internal edge of the primary base, so as to allow the display screen to slide and move. However, there is a difference in height between the end surface of the primary base and the keyboard, which is inconvenient for the user to operate the keyboard.

Accordingly, for example, U.S. Pat. No. 6,980,420 discloses a portable computer, wherein the display screen is not directly joined with the primary base, which is convenient for operation. The portable computer includes an expansion base, a system module having a display panel, and a support module. The support mode is joined to the external edge of the system module with a sliding portion, and it is slidably disposed on a corresponding third side of the expansion base, such that the support module slides between a first side and a second side of the expansion base. Moreover, the portable computer further includes a supporting portion pivoted to the sliding portion and positioned separately, such that an angle of the system module relative to the expansion base can be changed accordingly, thus, the system module is slidable and separable.

In the prior art, the display screen is joined to the external edge of the primary base via the support module, and the moving and sliding actions are also achieved through the support module. As the support module is exposed, the user easily touches the support module and gets hurt, and the overall appearance is not optimal.

SUMMARY

In view of the above prior arts, there is a difference in height between the end surface of the primary base and the keyboard, thus, when operating the keyboard, the operating space for the user is limited; moreover, as the sliding and rotating mechanism is disposed on the external edge of the primary base, the user easily touches it and gets hurt. In view of the above problems, the present invention provides a portable electronic device, which disposes a sliding and rotating mechanism on an end surface of a primary base, thereby providing the user with a preferred and safer operating space.

To achieve the aforementioned object, the present invention provides a portable electronic device, which comprises a primary body, a sliding base, at least one pivoting base, and a secondary body, wherein a guide slot is disposed an edge of each of two opposite sides of the primary body; the sliding base is movable relative to the primary body and spans over the guide slots of the primary body; and the pivoting base is disposed on the sliding base and has a rotatable revolving shaft mounted on the edge of the body. Thus, the secondary body can slide and rotate relative to the primary body via the sliding base and the revolving shaft.

In the portable electronic device disclosed in the present invention, it is convenient to adjust the viewing distance and the viewing angle of the secondary body according to the user's requirements. Moreover, as the sliding and rotating mechanism is disposed on the end surface of the primary body instead of the internal edge or the external edge, the user's operation of the keyboard is not limited by the difference of height between the keyboard and the primary board, and the operating space is not limited as well. Meanwhile, the portable electronic device of the present invention has a simple structure, and it is convenient for being operated.

Detailed features and advantages of the present invention are described in the embodiments below, and their content is adequate for those skilled in the art to understand the technical content of the present invention and to implement the present invention. According to the content disclosed in the specification, the claims, and the drawings, those skilled in the art can easily understand the objects and advantages of the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

The portable electronic device disclosed in the present invention can be an UMPC, a tablet computer, and a notebook, however, which is not limited to be the UMPC, the tablet computer, and the notebook. For example, the technology disclosed in the present invention is also applicable to an object that can be opened, closed, and can slide and move. In the detailed description of the present invention below, the UMPC is taken as an applied embodiment of the present invention.

Figure 1A:
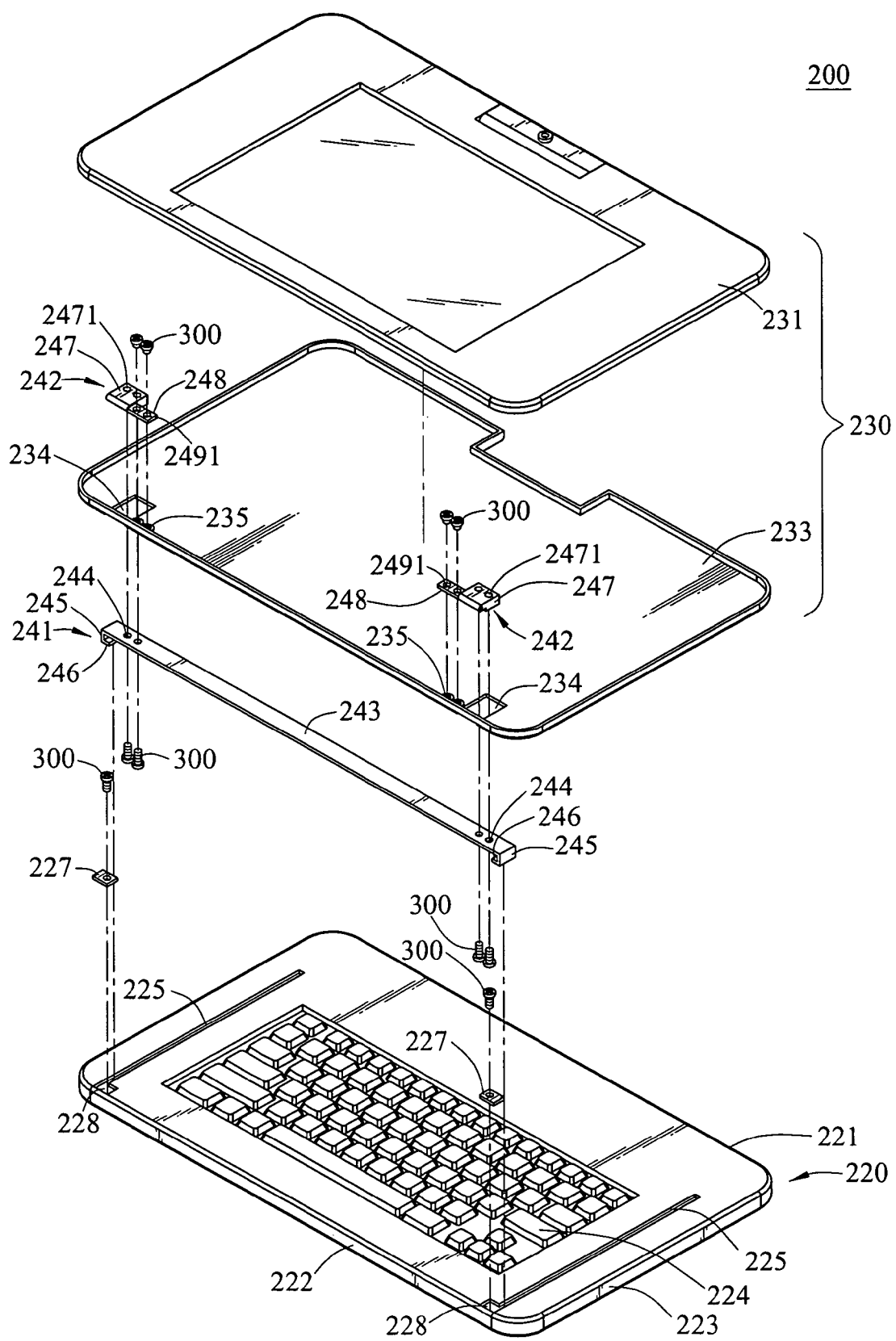
FIG. 1 is an exploded view of a structure of a first embodiment of the present invention.
FIG. 1B is a schematic view of a structure that the sliding base extends into the guide slots according to the first embodiment of the present invention.
Figure 1B:
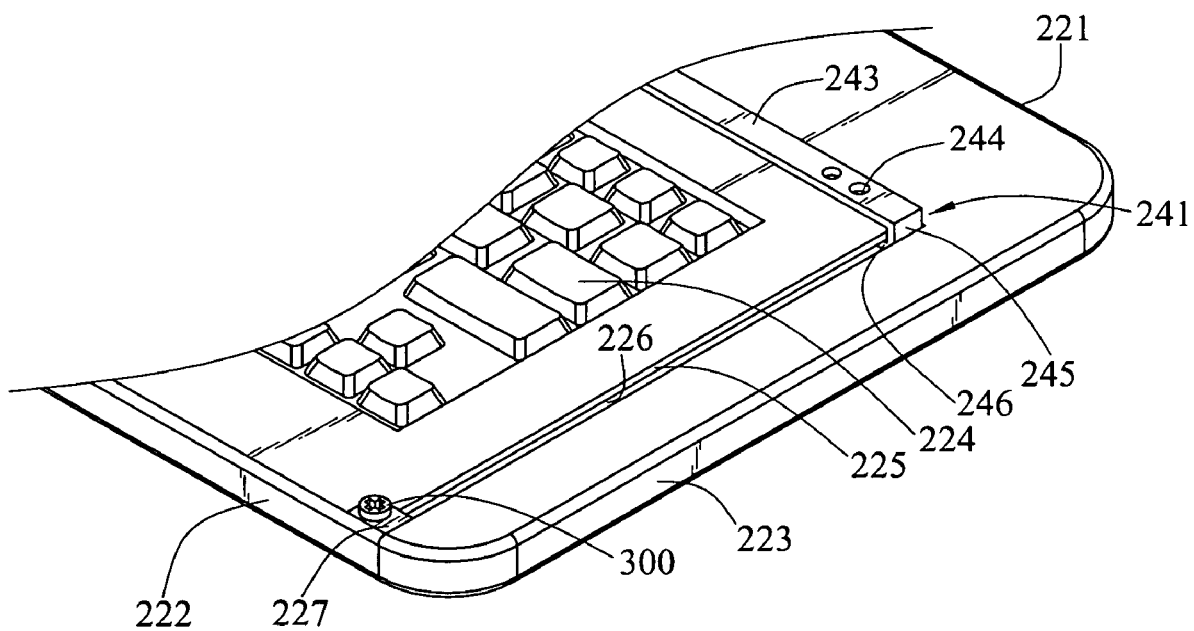

Referring to FIGS. 1A and 1B, an UMPC 200 of the first embodiment of the present invention includes a primary body 220, a secondary body 230, a sliding base 241, and pivoting bases 242. The primary body 220 is a rectangular body, which is not limited to be rectangular, and it may have other geometrical shapes. The primary body 200 includes a front wall 221, a rear wall 222 being opposite to the front wall 221, and side walls 223 between the front wall 221 and the rear wall 222. A keyboard 224 is further disposed on an end surface of the primary body 220, for a user to input control commands. Guide slots 225 are recessed on the primary body 220 and extend from positions near the rear wall 222 towards the front wall 221 in edges of two opposite sides of the keyboard 224, and a sliding slot 226 is disposed on a side wall of each of the guide slots 225. The guide slots 225 form accommodation portions 228 at positions where the front wall 221 and the end surface of the primary body 220 are connected, and two blocking members 227 are disposed at positions corresponding to the accommodation portions 228. Furthermore, the two blocking members 227 are fixed on the primary body 200 via locking members 300, and located at limiting positions of the guide slots 225, thus, when the sliding base 241 slides along the guide slots 225, the sliding base 241 can only moves to the limiting positions.

The sliding base 241 includes a supporting portion 243 spanning over an end surface of the primary body 220. The supporting portion 243 has a plurality of through holes 244 formed thereon, and has two interference portions 245 relatively extending from positions corresponding to the guide slots 225 of the primary body 220 on two ends of the supporting portion 243, and each of the interference portions 245 has a hook 236(246?) extending into each sliding slot 226. Thus, the hooks 246 are engaged with the sliding slots 226, so as to enable the sliding base 241 to move relative to the primary body 220 along the guiding slots 225.

The number of the pivoting bases 242 is the minimum number that is adequate for supporting the weight of the primary body 220 and facilitating the rotation. Herein, in the present invention, two pivoting bases 242 are taken as an example. However, the number of the pivoting bases 242 is not limited to two. Each of the pivoting bases 242 includes a fixing portion 247 and a revolving shaft 248 disposed on the edge of the fixing portion 247, and has positioning holes 2471 at positions corresponding to the through holes 244. Each fixing portions 247 is locked to the supporting portions 243 of the sliding base 241 via a plurality of locking members 300. Each of the revolving shafts 248 further includes a plurality of positioning holes 2491, and each of the revolving shafts 248 can rotate relative to the corresponding fixing portion 247.

The secondary body 230 includes a touch screen 231 and a top wall 233 opposite to the touch screen 231. The touch screen 231 is a liquid crystal panel, but is not limited to be the liquid crystal panel. In addition to be used for viewing images, the touch screen 231 also can be pressed and touched to function as an input interface of the primary body 220. Moreover, clipping slots 234 are respectively disposed at positions corresponding to the two pivoting bases 242 of the top wall 233, and a plurality of fixing holes 235 is arranged near the snapping slots 234. By passing the locking members 300 through the positioning holes 2491, the revolving shafts 248 are retained in the fixing holes 235. Thus, the secondary body 230 can rotate and slide relative to the primary body 220 via the revolving shafts 248 and the sliding base 241.

Figure 2:
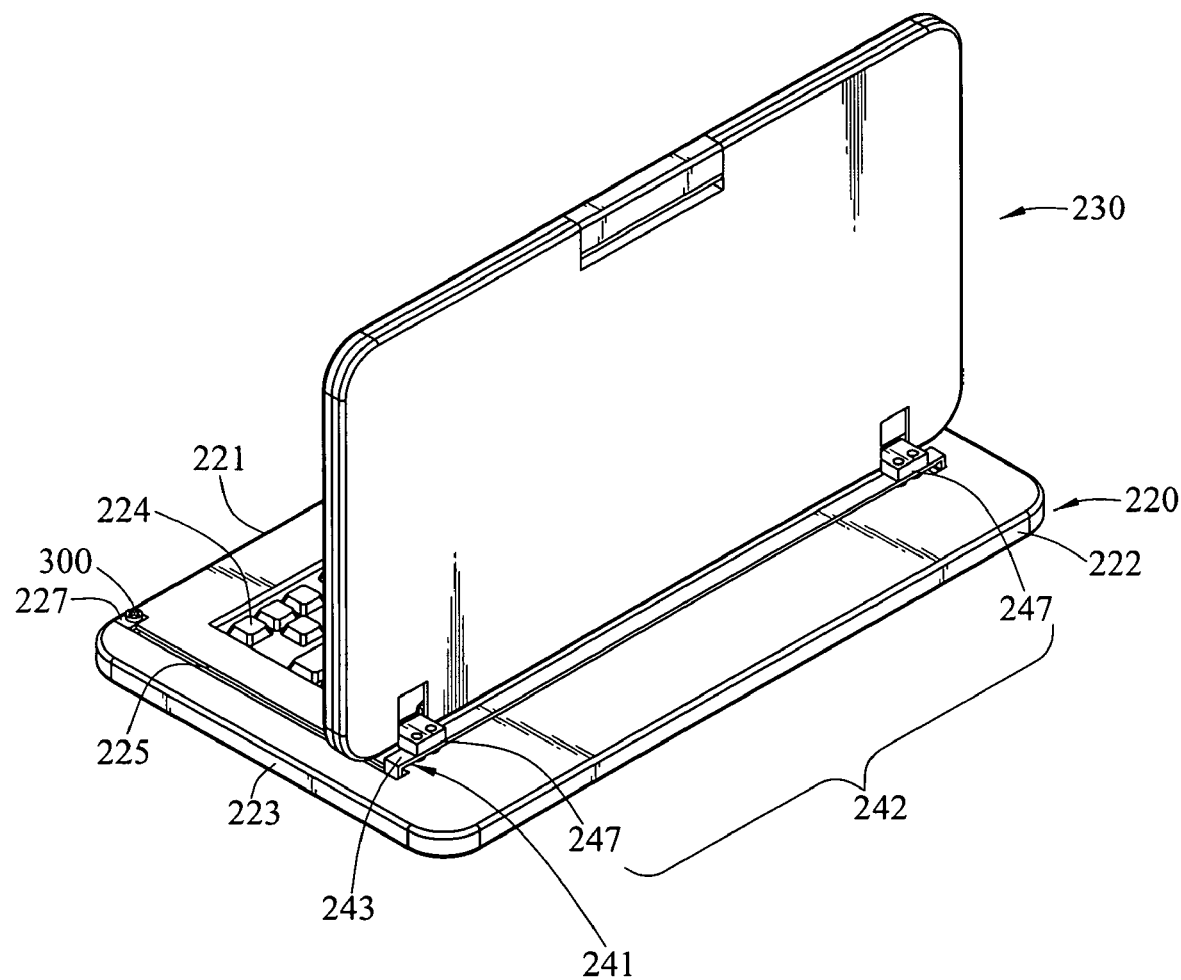
FIG. 2 is a combined view of the structure of the first embodiment of the present invention.
Figure 3A:
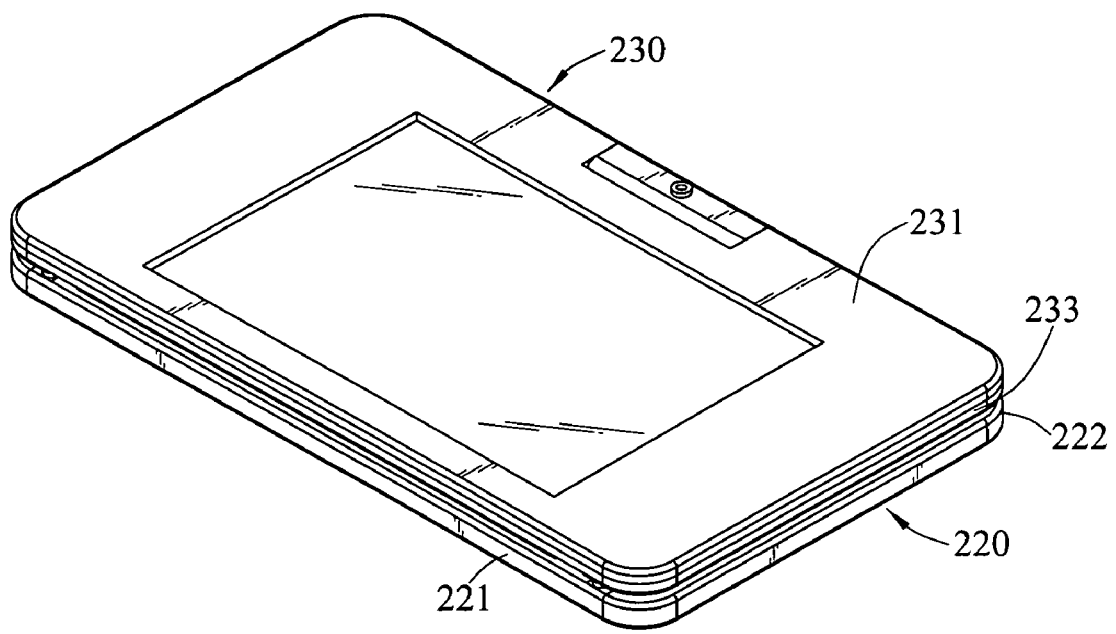
FIGS. 3A and 3B are schematic views showing that the secondary body slides with the touch screen being backed towards the primary body according to the first embodiment of the present invention.
Figure 3B:
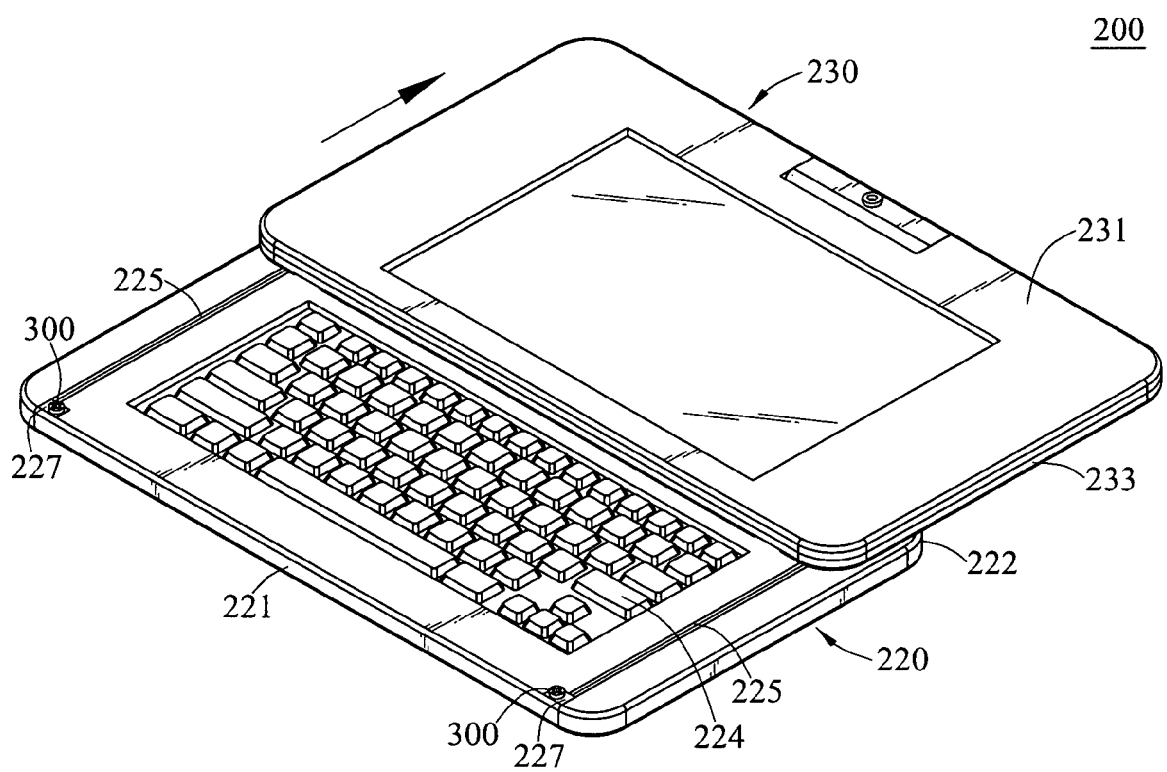
Figure 4A:
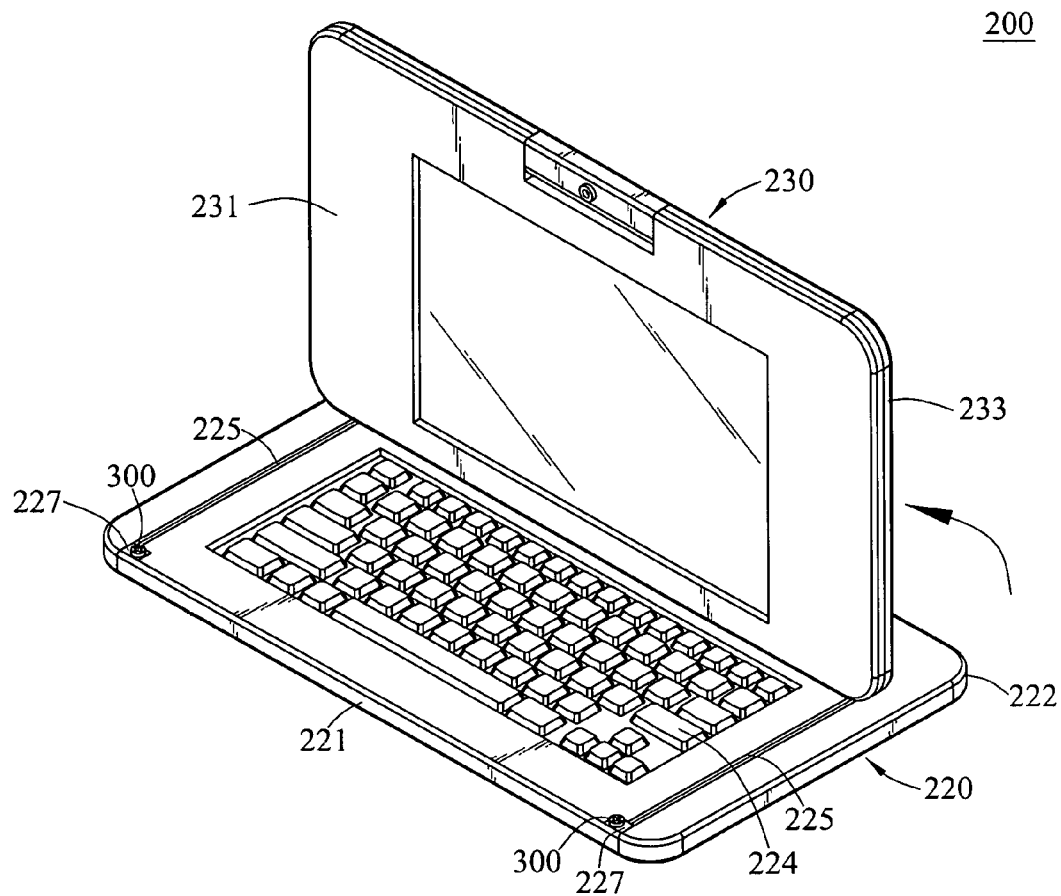
FIG. 4A is a schematic view showing that the secondary body rotates relative to the primary body according to the first embodiment of the present invention.
Figure 4B:
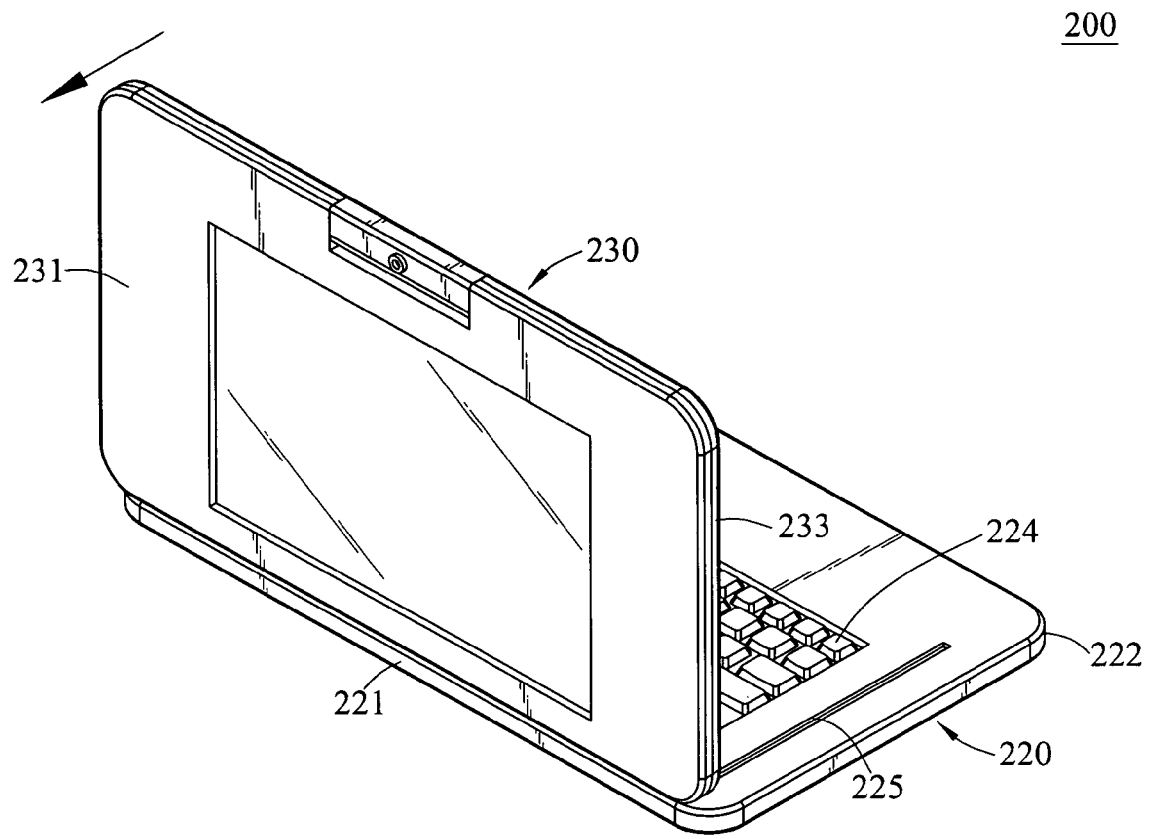
FIG. 4B is a schematic view showing that the secondary body rotates relative to the primary body and then slides according to the first embodiment of the present invention.

Referring to FIG. 2, as the secondary body 230 rotates relative to the primary body 220 via the pivoting bases 242, and the pivoting bases 242 are connected to the sliding base 241 via the fixing portions 247, and accordingly, the angle of the secondary body 230 to the primary body 220 can be changed, such that the secondary body 230 and the primary body 220 are closed and opened relative to each other. The sliding base 241 is movable on the primary body 220 through the hooks 246 operating together with the sliding slots 226, such that the secondary body 230 covers or exposes the keyboard 224 of the primary body 220.

Referring to FIGS. 3A, 3B, 4A, and 4B, when the UMPC 200 is not used, the top wall 233 of the secondary body 230 gets close to the primary body 220, such that the touch screen 231 is back toward the primary body 220, and the keyboard 224 is covered. When the UMPC 200 needs to be used, the secondary body 230 is driven to move towards the direction of the rear wall 222 of the primary body 220, and meanwhile, the sliding base 241 is driven to move along the guide slots 225 in the primary body 220. Thus, the secondary body 230 slides over the primary body 220 to gradually expose the keyboard 224. When the sliding base 241 stops upon bearing against the edges of the guide slots 225, the keyboard 224 on the primary body 220 is fully exposed, which is convenient for the user to operate the keyboard 224.

Then, the secondary body 230 is further rotated. The top wall 233 of the secondary body 230 gradually moves away from the primary body 220 via the pivoting bases 242, so that the secondary body 230 forms an inclined angle with the primary body 220. Thus, the user can adjust the relative angle between the secondary body 230 and the primary body 220, so as to obtain the optimal viewing angle of the touch screen 231. In addition, the secondary body 230 can also be driven to move towards the direction of the front wall 221 of the primary body 220 until the sliding base 241 moves to the limiting positions, so as to obtain the optimal viewing distance of the touch screen 231. When the secondary body 230 needs to get close to the primary body 220, the return operation can be performed according to the above steps, such that the touch screen 231 returns to the position where it is backed towards the primary body 220 and the keyboard 224 is covered.

Figure 5A:
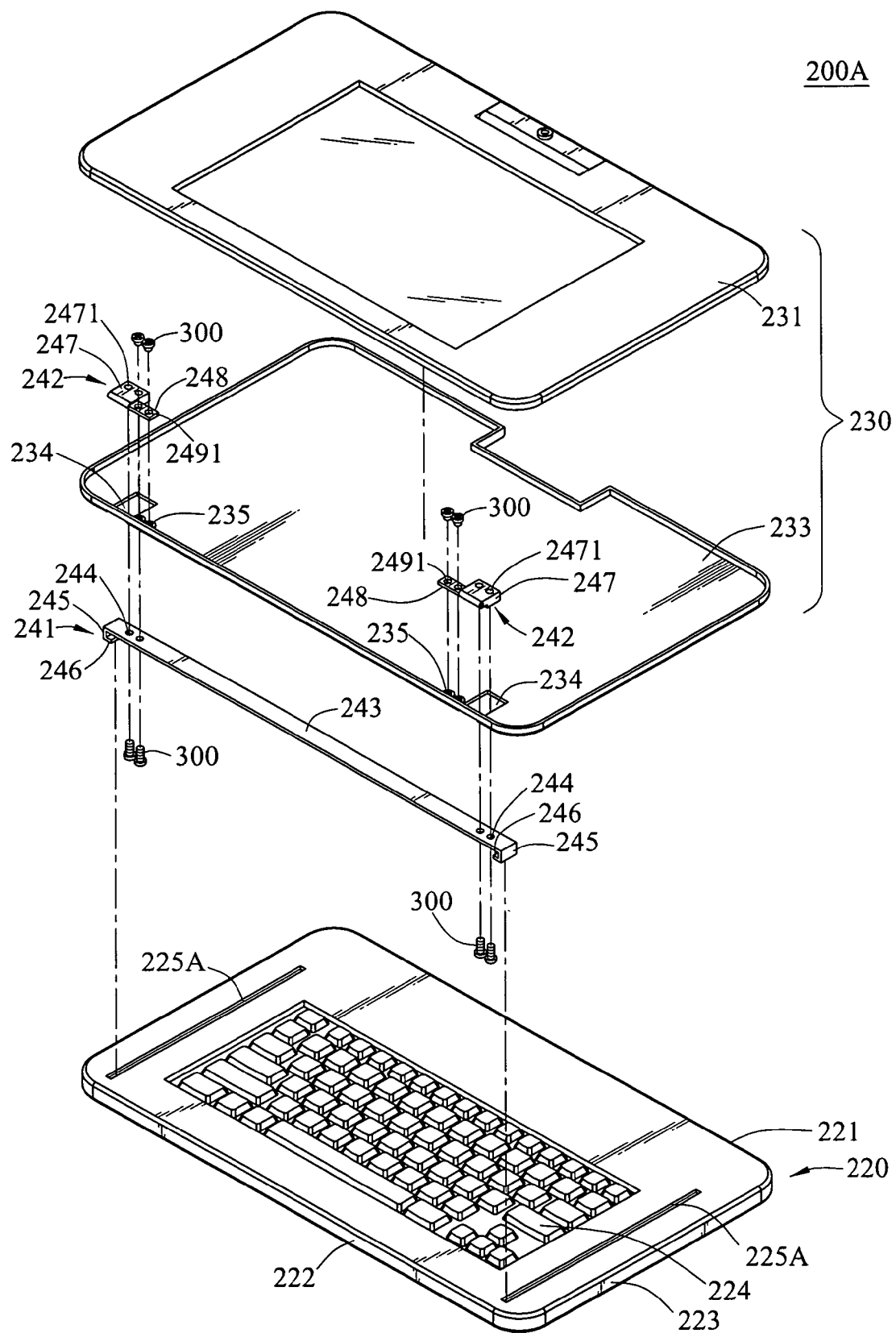
FIG. 5A is an exploded view of a structure of a second embodiment of the present invention.
Figure 5B:
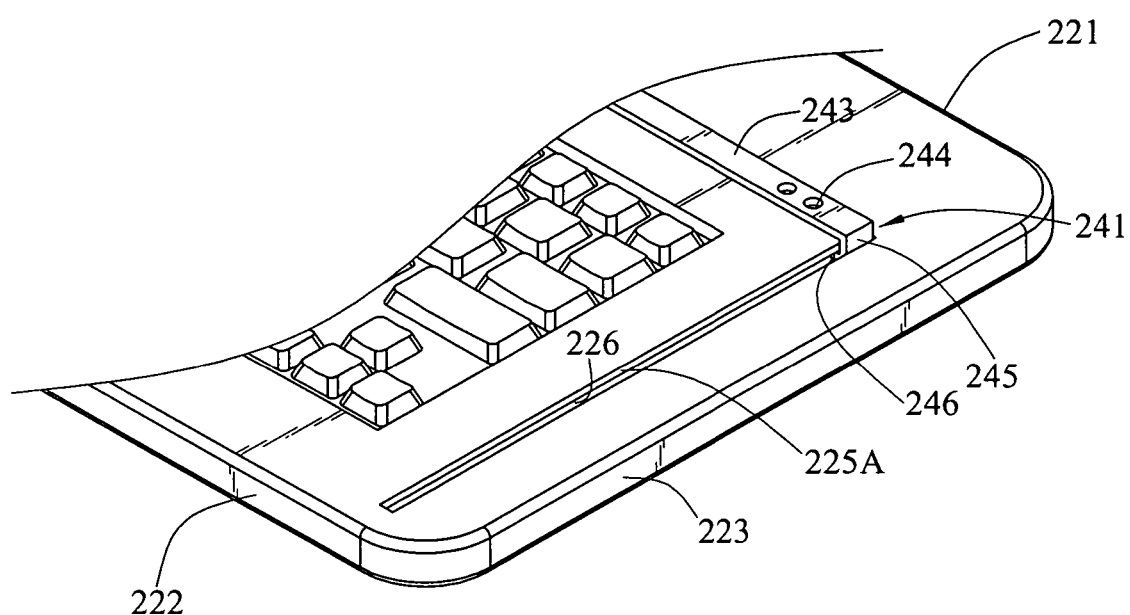
FIG. 5B is a schematic view of a structure that the sliding base extends into the guide slots according to the second embodiment of the present invention.

Referring to FIGS. 5A and 5B, an UMPC 200A according to a second embodiment is disclosed. The structure of the second embodiment is substantially the same as that of the first embodiment with the difference lying in that, the guide slots 225A of the primary body 220 extend from positions near the rear wall 222 to positions near the front wall 221, so as to limit the sliding range of the sliding base 241.

According to the portable electronic device disclosed in the present invention, the secondary body can rotate and slide relative to the primary body via the pivoting bases and the sliding base respectively, so as to present a plurality of different aspects. Moreover, the structure of the pivoting bases is simple, and the secondary body can easily achieve the rotating motion. In addition, the sliding base is disposed on the end surfaces of the primary body instead of the internal edge or the external edge, which not only facilitate the operation of the keyboard on the primary body, but also convenient for the user to adjust the viewing distance and the viewing angle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A portable electronic device, comprising:
a primary body having a guide slot disposed in an edge of each of two sides of the primary body, the primary body having a front wall and a rear wall opposite to the front wall, the guide slots extending from positions near the rear wall towards the front wall, a sliding slot arranged in a wall of each of the guide slots;
a sliding base being movable relative to the primary body and spanning over the guiding slots, the sliding base including a supporting portion that spans over an end surface of the primary body, the supporting portion having a plurality of through holes arranged thereon and two interference portions relatively extending from positions corresponding to the guide slots on two ends, each of the interference portions having a hook extending into each of the sliding slots;
at least one pivoting base disposed on the sliding base and having a rotatable revolving shaft, the pivoting base including a fixing portion and a revolving shaft disposed on an edge of the fixing portion, the revolving shaft being rotatable relative to the fixing portion; and
a secondary body having edges being fixed to the revolving shaft, a snapping slot arranged at a position corresponding to the pivoting base on the secondary body, the fixing portion located at a position of the snapping slot, so as to be locked on the supporting portion via a plurality of locking members;
wherein the secondary body rotates around the revolving shaft relative to the primary body, and slides relative to the primary body via the sliding base.

2. The portable electronic device as claimed in claim 1, wherein an accommodation portion is formed at a position near the front wall of each of the guide slots; a blocking member is disposed at a position corresponding to each of the accommodation portions, and each of the blocking members is at a limiting position of each of the guide slots; and when the sliding base moves along each of the guide slots, the sliding base is only allowed to move to the limiting position.

3. The portable electronic device as claimed in claim 1, wherein a keyboard is disposed on the primary body, and the secondary body moves along the guide slots via the sliding base, so as to cover or expose the keyboard.

4. The portable electronic device as claimed in claim 1, wherein the revolving shafts are disposed at positions near the snapping slots.

* * * * *